United States Patent [19]

Baileys et al.

[11] Patent Number: 4,502,370
[45] Date of Patent: Mar. 5, 1985

[54] INSULATED CHIMNEY ASSEMBLY

[75] Inventors: James P. Baileys, Wyoming; Warren R. Hedrick, Holland, both of Mich.

[73] Assignee: Interpace Corporation, Parsippany, N.J.

[21] Appl. No.: 485,226

[22] Filed: Apr. 15, 1983

[51] Int. Cl.³ ............................................. F23L 17/02
[52] U.S. Cl. .................... 98/60; 126/307 R; 110/184
[58] Field of Search ............. 110/254, 184; 98/60; 138/148, 149, 114; 285/47, 138; 126/307 R

[56] References Cited

U.S. PATENT DOCUMENTS

| 2,679,867 | 6/1954 | Epstein | 138/63 |
| 2,978,261 | 4/1961 | Epstein | 126/307 R |
| 2,980,448 | 4/1961 | Holben | 285/47 |
| 3,055,417 | 9/1962 | Reed | 98/60 X |
| 3,769,923 | 11/1973 | Lawrence | 110/184 |
| 3,842,721 | 10/1974 | Cardif | 98/60 |
| 3,872,780 | 3/1975 | Zanias | 98/60 |

Primary Examiner—William E. Wayner
Assistant Examiner—John Sollecito
Attorney, Agent, or Firm—Varnum, Riddering, Schmidt & Howlett

[57] ABSTRACT

Linear sections (101) of a chimney assembly (100) each include concentric outer, intermediate and inner sleeves (102, 104, 106). The inner sleeve (106) is interconnected at its lower portion (140) to the intermediate sleeve (104) through spaced apart U-shaped clips (142), while the upper portion of the inner sleeve (106) is allowed to float. The inner sleeve (106) is thus spaced apart from the intermediate sleeve (104) with an insulative air gap (136) therebetween. The air gap (136) and the particular connective arrangement of the inner sleeve (106) to the intermediate sleeve (104) allows for both linear and radial thermal expansion of the inner sleeve (106) caused by high temperature waste flue gases, and also facilitates engagement of adjoining linear sections (101).

6 Claims, 4 Drawing Figures

4,502,370

INSULATED CHIMNEY ASSEMBLY

DESCRIPTION

1. Technical Field

The invention relates to prefabricated chimney assemblies and, more particularly, to chimney assemblies of the triple wall construction type for providing high temperature insulative properties.

2. Background Art

Insulated, prefabricated chimney assemblies, utilized for exhausting waste flue gases away from free-standing wood burning stoves, have been of simple two wall insulated construction. It has been known to construct such assemblies of linear sections which can be joined together to form an assembly of a desired length. Each of the sections can be formed of two concentric walls with a solid material insulation between the walls. However, industry standards are beginning to require greater insulation properties for potentially higher flue temperatures.

Another requirement of commercial chimney assemblies relates to the material construction of the assemblies. It is evident that materials exposed to relatively high temperature flue gases must be capable of withstanding the same. In addition, however, such materials must also be capable of effective heat distribution, thereby avoiding "hot spot" formations. Furthermore, the surfaces directly exposed to waste flue gases of relatively high temperatures should be constructed of materials which tend to preclude surface build up of solid waste particles, thereby avoiding the well-known problem of creosote "burn out" within the assembly.

These and other concerns have resulted in the development of chimney assemblies having multiple wall constructions where the outer wall exposed to the environment can be constructed of materials which differ from those of the inner wall directly exposed to the flue gases. For example, the U.S. Pat. No. 3,872,780 to Zanias issued Mar. 25, 1975, discloses a chimney assembly having pipe sections with three concentrically aligned cylindrical walls. Annular rings join the inner and outer walls at the upper and lower ends of each pipe section, with an intermediate section captured between the rings.

Another example of a triple wall chimney construction is shown in the U.S. Pat. No. 3,842,721 to Cardiff issued Oct. 22, 1974. The Cardiff patent discloses a three wall insulated chimney having an insulation layer between the inner and middle walls. Clips rigidly secure together the outer, intermediate and inner walls. The upper end of the inner wall is flared to receive the lower end of the inner wall of an adjacent pipe section.

One problem inherent to chimney assemblies of multiple wall construction is that the different walls are subject to different temperatures and accordingly expand and contract different amounts. Thermal expansion and contraction caused by temperature changes of the parts can thus result in buckling and severe damage to the assemblies. Accordingly, it is advantageous to provide limited movement of various assembled chimney parts relative to other parts, especially assembled parts directly exposed to the high temperatures inherent in combustion devices such as wood burning stoves. However, it is also necessary to provide secure structural interconnections between the various assembled parts.

DISCLOSURE OF THE INVENTION

According to the invention, a chimney assembly includes linear sections with inner, intermediate and outer sleeves which are secured together so as to allow for independent thermal expansion of the inner sleeve with respect to the intermediate and outer sleeves. The assembly includes means to secure at least one end portion of the intermediate sleeve to an end portion of the outer sleeve and means to secure only one end portion of the inner sleeve to one end portion of the intermediate sleeve while maintaining remaining portions of the inner sleeve in a floating relationship so as to allow for thermal expansion and contraction of the inner sleeve independent of the intermediate sleeve. The remaining portions of the inner sleeve are maintaned in a spaced apart relationship relative to the intermediate sleeve so as to provide a spatial air gar between the sleeves for radially outward expansion of the inner sleeve.

The assembly includes solid pack insulation material between the intermediate and outer sleeves. In one embodiment of the invention, only one end portion of the intermediate sleeve is secured to an end portion of the outer sleeve. The end portion of the intermediate sleeve secured to the outer sleeve is opposite the end portion of the intermediate sleeve secured to the inner sleeve, thereby reducing the relative axial displacement of chimney assembly components during thermal expansion.

Also in accordance with the invention, the inner sleeve includes a guide means for receiving and aligning one end of an inner sleeve of an adjoining linear section. Furthermore, the means for securing the one end portion of the inner sleeve to the one end portion of the intermediate sleeve includes a plurality of spaced apart clips which are secured to both an outer surface of the inner sleeve and an inner surface of the intermediate sleeve.

In one embodiment of the invention, the means for securing the intermediate sleeve to the outer sleeve includes an annular ring rigidly connecting only the upper ends of the sleeves. The inner sleeve includes a cylindrical main body of a first diameter with a cylindrical guide surface integrally connected to the one end of the main body and having a diameter greater than the first diameter.

BRIEF DESCRIPTION OF THE DRAWINGS

A preferred embodiment of the invention will now be described with reference to the drawings in which.

BEST MODE FOR CARRYING OUT THE INVENTION

Figure 1:
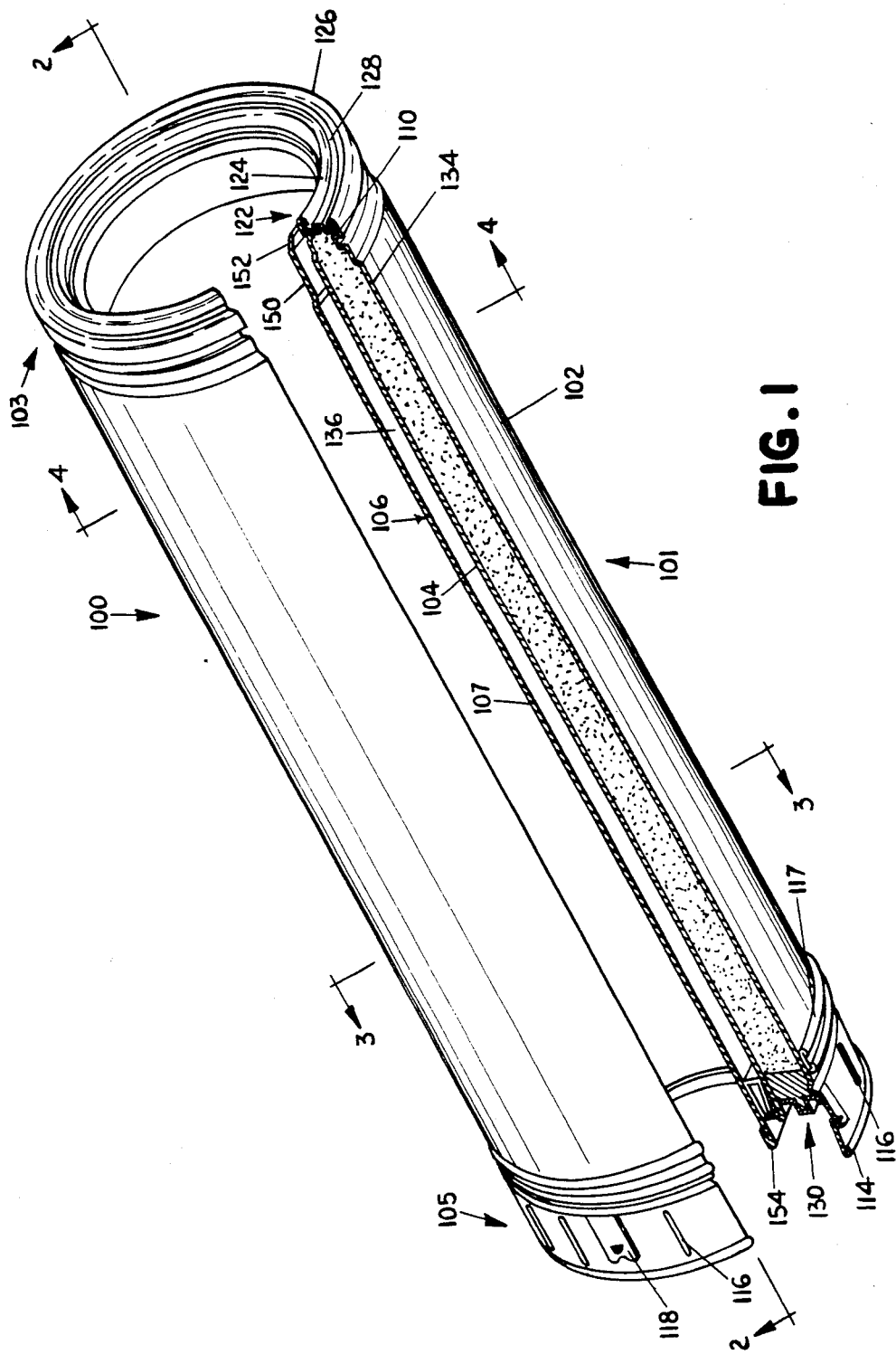
FIG. 1 is a perspective view of a linear section of an insulated chimney assembly in accordance with the invention.

The principles of the invention are disclosed, by way of example, in a linear section 101 of an insulated chimney assembly 100 depicted in FIG. 1. In constructing an entire chimney of a particular length, a selected number of the linear sections 101 can be fitted together as subsequently described herein. The chimney assembly 100 is of the triple wall construction type and is adapted to provide a safe and durable passage for hot flue gases having a wide range of temperature excursions. The assembly 100 can be utilized with various types of fuels including oil, coal and wood, and is particularly suitable for use with wood burning stoves and the like where flue gas temperatures may reach 2100° F.

Figure 2:
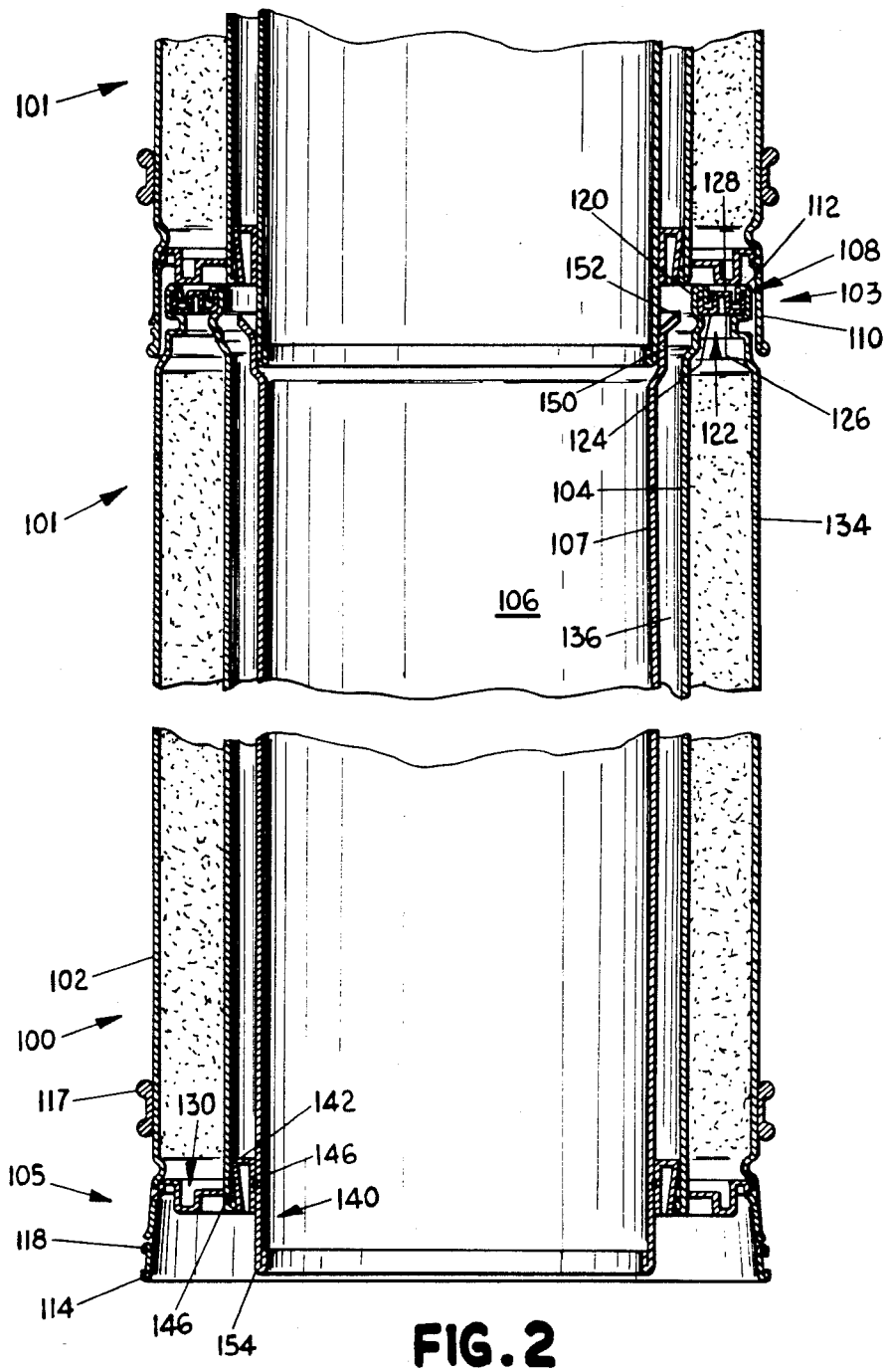
FIG. 2 is a sectional view of the chimney assembly taken along lines 2—2 of FIG. 1 and additionally showing the engagement of the sleeves of one section of the assembly with the sleeves of an adjoining linear section.
Figure 3:
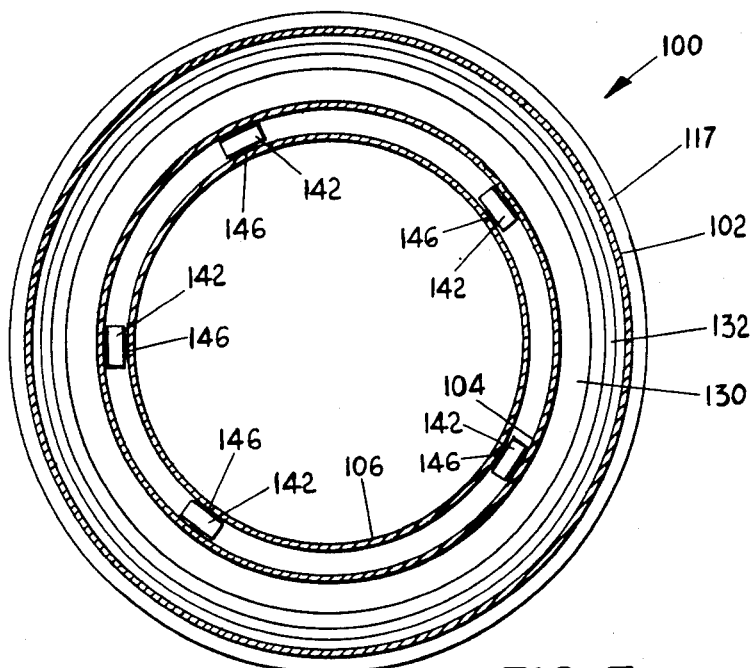
FIG. 3 is a sectional end view of the lower end of a linear section of the chimney assembly taken along lines 3—3 of FIG. 1.
Figure 4:
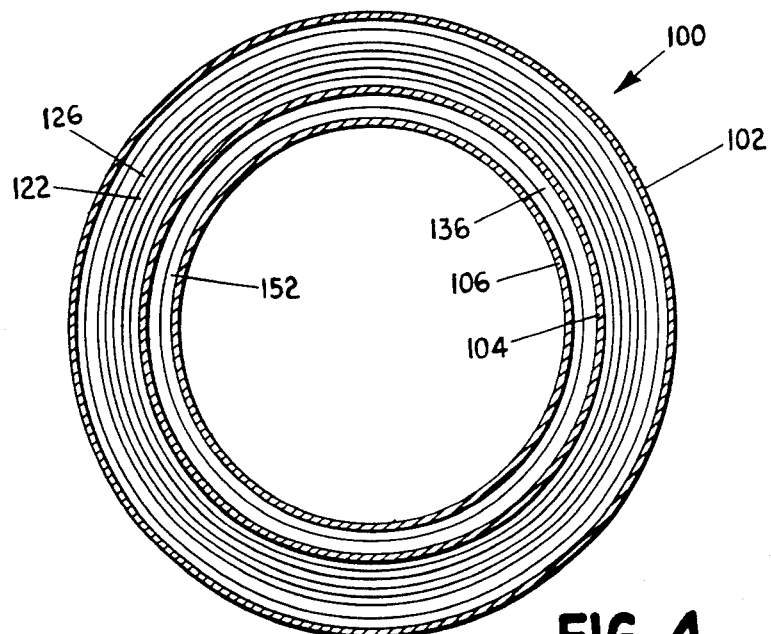
FIG. 4 is a sectional end view of the upper end of a linear section of the chimney assembly taken along lines 4—4 of FIG. 1.

Each linear section 101 of the chimney assembly 100 is of identical construction and comprises three substantially cylindrical sleeves designated in the drawings as outer sleeve 102, intermediate sleeve 104 and inner sleeve 106. An upper annular collar 103 forms a male end portion at the top of each linear section 101 as an integral portion of outer sleeve 102. Similarly, a female end portion is formed by a lower annular collar 105 at the bottom of section 101 as an integral portion of outer sleeve 102. As illustrated in FIG. 2 and described in greater detail subsequently herein, a selected length of assembly 100 can be formed by coupling together an upper annular collar 103 of one section 101 and a lower annular collar 105 of another section 101.

The outer sleeve 102 can have any suitable desired length and is of a substantially constant cross sectional diameter throughout its longitudinal length between the collars 103 and 105. Like intermediate and inner sleeves 104 and 106, respectively, the outer sleeve 102 can be constructed of various suitable and well-known materials, and can be formed in a conventional manner.

As shown in FIG. 2, the upper portion of outer sleeve 102 which forms the annular collar 103 is angled slightly inwardly so as to form the collar 103 with a diameter somewhat smaller than the elongated body of sleeve 102. The collar 103 includes an annular flange 108 having a seat portion 110 and a terminating outer lip 112 which is crimped inwardly.

The lower portion of outer sleeve 102 which forms the annular collar 105 is of a substantially constant cross sectional diameter and can be bent outwardly at its terminating edge to form a curl 114. Spaced apart around the cylindrical outer surface of collar 105 are a number of recessed embossings 116 which are formed to reduce friction during chimney assembly. Also spaced apart around the cylindrical surface of collar 105 and between the embossings 116 are a number of locking tabs 118 lanced within the collar surface. The locking tabs 118 are utilized in combination with a lock ring 117 mounted around the outer circumferential surface of sleeve 102 to lock together adjacent linear sections 101 of chimney assembly 100. The construction and locking arrangement provided by tabs 118 is generally described in the commonly assigned U.S. Pat. No. 3,065,002, now expired, and does not form the basis for any of the novel concepts of a chimney assembly in accordance with the present invention.

The intermediate sleeve 104, having a smaller diameter than outer sleeve 102, is positioned concentrically within sleeve 102 and spaced apart therefrom. As depicted in cross-section in FIG. 2, the upper portion of intermediate sleeve 104 is flared slightly outwardly and terminates in an annular inner lip 120 which is crimped outwardly. To secure the upper portions of outer sleeve 102 and intermediate sleeve 104 together in a spaced apart relationship, an annular ring 122 having a cross-sectional configuration as depicted in FIG. 2 is utilized.

The ring 122 includes an inner flange 124 which is secured within the lip 120 of intermediate sleeve 104. An outer flange 126 of the ring 122 is similarly secured within the outer lip 112 of outer sleeve 102 and is supported on the seat portion 110 of annular flange 108. The flanges 124 and 126 are configured so as to form an upwardly extending annular ledge 128 intermediate the flanges 124 and 126.

An annular lower ring 130 having a cross-sectional configuration as depicted in FIG. 2 is positioned intermediate the lower portions of outer sleeve 102 and intermediate sleeve 104. The ring 130 is held in place by means of "staking", i.e. pushing the outer sleeve 102 radially inwardly immediately above the upper surface of ring 130. It should be emphasizd that no rigid connection exists between intermediate sleeve 104 and the lower ring 130. The only rigid connection between intermediate sleeve 104 and outer sleeve 102 is provided by the upper ring 122. Accordingly, the intermediate sleeve 104 is allowed to axially expand during periods of thermal expansion.

The space intermediate the outer sleeve 102 and intermediate sleeve 104 between the upper clip ring 122 and lower connecting ring 130 is packed with a solid insulation pack material 134. The use of insulation pack material is conventionally known in chimney assemblies of multiple wall construction. It should be noted that lower ring 130 will be staked to outer sleeve 102 after filling the annular space between sleeves 102 and 104 with the insulation material 134.

The inner sleeve 106 of linear section 101 is concentrically positioned within and spaced apart from the intermediate sleeve 104, with a spatial air gap 136 formed therebetween. The employment of the air gap 136 is of primary importance as described subsequently herein. The inner sleeve 106 comprises a cylindrical main body portion 107 of substantially constant cross-ssectional diameter and extending axially through the linear section 101. As depicted in FIG. 2, the lower portion of inner sleeve 106 extends somewhat below the lower portion of intermediate sleeve 104 and terminates at a lower portion 140 in a hemmed end 154. Above the hemmed end 154, the inner sleeve 106 is secured in a spaced apart relationship from intermediate sleeve 104 by means of a number of U-shaped clips 142 uniformly spaced around the circumferential surface of the inner sleeve 106. The U-shaped clips 142 are secured to the lower portion 140 of inner sleeve 106 and the inner circumferential surface of intermediate sleeve 104 by means of spot welds 146. Preferably, five U-shaped clips 142 can be utilized, each spaced apart approximately 72° from adjacent clips.

The upper portion of the main body 107 of inner sleeve 106 is expanded slightly outwardly and joins a cylindrical and upwardly extending guide surface 150 of substantially constant cross-sectional diameter which is larger than the diameter of the main body portion 107. The upper edge of guide surface 150 is integral with flange portion 152 which is outwardly flared and assists in guiding the assembly of adjoining linear sections 101.

An entire length of chimney for directing away waste flue gases can be constructed by axially fitting together a selected number of linear sections 101 of chimney assembly 100. That is, the lower annular collar 105 of a first linear section 101 can be fitted around the upper annular collar 103 of an adjoining linear section 101 mounted directly above the first linear section 101. The lock ring 117 on the upper linear section 101 can be moved downwardly to push the locking tabs 118 inwardly so that they are secured within the annular recess 156 of the upper collar 103 of the adjoining first linear section 101. Further, the lower end 140 of inner sleeve 106 of the upper section 101 is fitted concentrically within and adjacent to guide surface 150 of the lower section 101. Accordingly, surface 150 of each section 101 acts as a guide for interconnection to an adjoining section 101.

With the sections 101 connected as described above, waste flue gases are made to flow axially within each of the inner sleeves 106. However, with chimney assemblies of multiple wall construction, severe thermal expansion and contraction of assembly elements can result from temperature excursions of the flue gases. In particular, inner walls directly exposed to high temperature gases are extremely susceptible to extensive thermal expansion/contraction. If an inner wall is rigidly connected to other chimney assembly elements, or if the inner walls of coupled linear sections are rigidly interconnected, wide gas temperature excursions can readily produce cracking and buckling of assembly elements.

However, in accordance with the chimney assembly 100 described herein, the inner sleeve 106 is connected to the intermediate sleeve 104 by means of clips 142 only at one end and is otherwise allowed to "float" relative to intermediate sleeve 104, with the spatial air gap 136 maintained between sleeves 104 and 106. Although the interconnection of the inner sleeve 106 at its lower end to intermediate sleeve 104 by means of clips 142 provides a secure mounting connection for sleeve 106, the floating configuration of sleeve 106 and the air gap 136 will allow for thermal expansion of the sleeve 106 without the occurrence of buckling.

The air gap 136 is of primary importance in that it allows for radial expansion of sleeve 106 without the physical restraint of contact with a solid insulation between sleeves 104 and 106, while still providing substantial insulative properties. It should be noted that a cylindrical element subjected to high temperatures has its weakest structural strength in a radially inward direction. Accordingly, if the sleeve 106 were prevented from radial outward expansion because of solid materials between sleeves 104 and 106, the sleeve 106 may buckle inwardly to relieve the expansion forces produced by increased temperatures. If buckling occurs, the sleeve 106 will not return to its normal position upon cooling and the integrity of the sleeve 106 may be destroyed. The spatial air gap 136 prevents such inward buckling by providing an annular space for sleeve 106 to radially expand outwardly.

In addition, the connection of inner sleeve 106 to intermediate sleeve 104 only at one end allows for axial movement of sleeve 106 during thermal expansion, again preventing buckling of sleeve 106. Furthermore, by rigidly connecting intermediate sleeve 104 to outer sleeve 102 only at its end opposite to the end connected to the inner sleeve 106, the intermediate sleeve 104 is also allowed to axially expand when subjected to high temperatures. In addition, the expansion of intermediate sleeve 104 will be in an opposing axial direction relative to the expansion of inner sleeve 106, thereby reducing the relative axial displacement of the chimney assembly components.

With the triple sleeve construction of chimney assembly 100, the spatial air gap 136 between the inner sleeve 106 and the intermediate sleeve 104 provides substantial insulation. That is, there can be a large temperature drop across gap 136. Accordingly, the pack material 134 between intermediate sleeve 104 and outer sleeve 102 need not have the high quality insulative properties of solid pack materials used in high temperature chimneys of double wall construction. Relatively less expensive insulation materials can therefore be utilized for insulation pack 134. Furthermore, the spatial air gap 136 has relatively better insulative properties than would solid pack insulation for controlling conductive heat transfer. For controlling radiant heat transfer, the air gap 136 will have insulative properties similar to those of solid materials.

The employment of the triple sleeve construction also allows for use of materials in direct contact with wood or coal flue gases which may be highly corrosive. For example, the inner sleeve 106 can be constructed of Type 316 stainless steel which is substantially resistant to corrosive gases at high temperatures but has a relatively high resistance to corrosion from oxides of sulfur and other wood and coal gases. The sleeves 102 and 104, which do not directly contact the flue gases, can be constructed of Type 430 stainless steel, which has a relatively lower coefficient of expansion and does not have the corrosion resistant properties of Type 316 stainless steel.

In addition to the advantages of chimney assembly 100 heretofore described, it is apparent that the inner sleeve 106 can be connected, in a manner in accordance with the invention, to existing chimney assemblies of double wall construction without complete disassembly of such chimneys. Accordingly, the construction described herein readily allows retrofit of conventional assemblies to attain a triple sleeve chimney assembly in accordance with the invention.

Finally, the chimney assembly 100 having a triple sleeve configuration is inherently safer than a double wall chimney configuration. The increased safety especially occurs where the inner sleeve 106 is retrofitted to an assembly corresponding to the assembly 100 described herein, which would conform to industry safety standards even in the absence of inner sleeve 106.

It should be noted that the particular chimney assembly 100 and interconnection of the various elements thereof as described herein are not meant to be an exhaustive enumeration of the particular chimney assembly arrangements which can be utilized in accordance with the invention. Accordingly, it will be apparent to those skilled in the pertinent art that modifications and variations of the above-described illustrative embodiments of the invention can be effected without departing from the spirit and scope of the novel concepts of the invention.

The embodiments of the invention in which an exclusive property or privilege is claimed are defined as follows:

1. In a chimney assembly for use with flue gases having a wide range of temperature excursions, wherein the assembly comprises axially connectable linear sections, each having substantially cylindrical and concentrically positioned inner, intermediate and outer sleeves, and means for securing the intermediate sleeve to the outer sleeve, the improvement which comprises:
   solid pack insulation material between the intermediate sleeve and the outer sleeve;
   means for securing only one end portion of the inner sleeve to an end portion of the intermediate sleeve while maintaining the remaining portions of the inner sleeve in a floating relationship relative to the intermediate sleeve so as to allow for unrestrained thermal expansion and contraction of the inner sleeve in an axial direction with respect to the intermediate sleeve; and the remaining portions of the inner sleeve are maintained in a spaced apart relationship relative to the intermediate sleeve so as to provide a spatial insulative air gap therebetween for radially outward thermal expansion of the inner sleeve.

2. A chimney assembly in accordance with claim 1 wherein only one end portion of the intermediate sleeve is secured to an end portion of the outer sleeve, said end portion of the intermediate sleeve being opposite the end portion of the intermediate sleeve secured to the inner sleeve, thereby reducing the relative axial displacement of chimney assembly components during thermal expansion.

3. A chimney assembly in accordance with claim 1 wherein the inner sleeve of each linear section comprises a guide means for receiving and aligning one end of an inner sleeve of an adjoining linear section.

4. A chimney assembly in accordance with claim 1 wherein the means for securing the one end portion of the inner sleeve to the end portion of the intermediate sleeve comprises a plurality of spaced apart clips secured to an outer surface of the inner sleeve and to an inner surface of the intermediate sleeve.

5. A chimney assembly in accordance with claim 4 wherein the clips are each spot welded to the inner sleeve and the intermediate sleeve.

6. A chimney assembly in accordance with claim 1 wherein:

the means for securing the intermediate sleeve to the outer sleeve comprises an annular ring rigidly connecting only the upper ends of the intermediate sleeve and the outer sleeve;

the inner sleeve comprises a cylindrical main body of a first diameter, and a cylindrical guide surface extending from an upper end of the main body and having a diameter greater than the first diameter; and the means for securing the inner sleeve to the intermediate sleeve comprises a plurality of spaced apart clips spot welded to the lower portions of the inner sleeve and the outer sleeve.

* * * * *